United States Patent [19]

Jeon et al.

[11] Patent Number: 5,500,887
[45] Date of Patent: Mar. 19, 1996

[54] DATA ACCESS METHOD FOR SUBSCRIBER LOCATION INFORMATION

[75] Inventors: Hak-Seong Jeon; Sung-Hee Kim, both of Daejeon, Rep. of Korea

[73] Assignee: Electronics & Telecommunications Research Institute, Daejeon, Rep. of Korea

[21] Appl. No.: 353,233

[22] Filed: Dec. 2, 1994

[30]      Foreign Application Priority Data

May 14, 1994 [KR]    Rep. of Korea .............. 94-10567

[51] Int. Cl.⁶ .................................................. H04Q 7/38
[52] U.S. Cl. .................................................. 379/58; 379/59
[58] Field of Search .............................. 370/94.1; 379/57, 379/58, 59, 60, 62, 201, 211, 222, 233; 380/21; 455/33.1, 34.1

[56]                 References Cited

U.S. PATENT DOCUMENTS

| | | | |
|---|---|---|---|
| 4,924,510 | 5/1990 | Le ................................................ | 379/211 |
| 5,396,543 | 3/1995 | Beeson, Jr. et al. ......................... | 379/59 |
| 5,400,390 | 3/1995 | Salin ............................................. | 379/59 |
| 5,428,665 | 6/1995 | Lantto .......................................... | 379/58 |

OTHER PUBLICATIONS

DeLory, Treillard, "Security, and Saturation Solutions for GSM" Telephone Engineer and Management, Jan. 16, 1991.
Mouly, Pautet, "The GSMS System for Mobile Communications".

*Primary Examiner*—Curtis Kuntz
*Assistant Examiner*—William Cumming
*Attorney, Agent, or Firm*—Antonelli, Terry, Stout & Kraus

[57]              ABSTRACT

A data access method for subscriber location information in storing and controlling subscriber location information in a digital mobile communication network is disclosed. The data access method provides a search procedure, an addition procedure and a deletion procedure for the subscriber location information using a database of a main memory and a hardware of a sub memory, thereby embodying a real time system based on the main memory database and being capable of satisfying a fast response characteristic and high data process amounts demanding for the subscriber location information control.

1 Claim, 4 Drawing Sheets

DATA ACCESS METHOD FOR SUBSCRIBER LOCATION INFORMATION

BACKGROUND THE INVENTION

The present invention relates to a dada access method for subscriber location information in a digital mobile communication system.

In general, a network element which stores and controls subscriber location information in a digital mobile communication network is defined with European mobile communication standard format and American standard format.

It is said to be a location register which implements a mobile characteristic control and a service control for providing a digital cellular phone service.

Data that said location register mainly controls is regarded as subscriber location information and data access for subscriber location information should endure the fast response characteristic and a large amount of process.

A system for controlling data, thus subscriber location information defines and embodies the function thereof in accordance with a national format in abroad. However, it demands for a data search, a data addition, and data deletion so as to process a data access with a real time, differently from the prior art in domestic.

The method is regard as a real-time data access method and the present invention is for embodying a data access method for a main memory database which is capable of searching, adding and deleting subscriber location information.

The prior data access method with a real time database technology based on the main memory database is embodied in a digital switching system.

Although this method effectively searches and renews data of a static characteristic, it is not suitable to dynamically changeable data such as subscriber location information.

Accordingly, it demands for a data access method for processing dynamically changeable data in a main memory database.

SUMMARY OF THE INVENTION

Accordingly, the present invention is to solve above problems and it is an object of the present invention to provide a data access method for subscriber location information based on the main memory database in controlling subscriber location information in a digital mobile communication system.

To obtains above objects, the present invention defines a hardware configuration embodying a data access method for subscriber location information based on a main memory database and extend a capacity of the main memory of 32M bytes which is a main element of the hardware and is controlled by a main processor of a mobile communication switching system from two times to four times, because the hardware stores a database of a large scale in the main memory.

And the present invention is for embodying a physical data access structure for subscriber location information for searching and changing the subscriber location information.

DETAILED DESCRIPTION OF THE PREFERRED EMBODIMENTS

Figure 1:
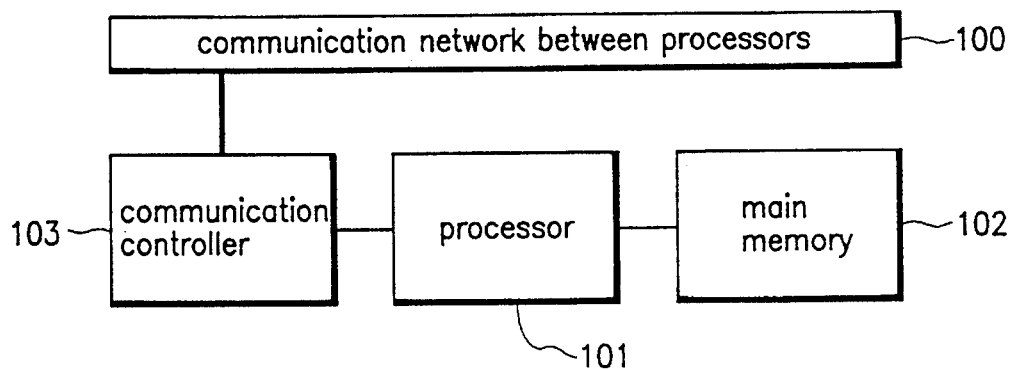
FIG. 1 is a configuration hardware diagram for embodying a data access method for subscriber location information which becomes a circumstance of the present invention.

FIG. 1 shows a hardware configuration embodying data access method for subscriber location information, which becomes a circumstance of the present invention.

A processor 101 receives a remote data access call transferred through a communication network 100 between processors, thereby accomplishing a data access for subscriber location information.

A remote data access through the communication network 100 between processors controlled by a communication controller 103 is accomplished from an application processor connected to a communication network 100 between processors to a database processor.

A data access method for subscriber location information is processed through the processor 101 in the database processor and a main memory 102 stores a database which has the subscriber location information related with a data access control structure utilized in a data access method.

Figure 2:
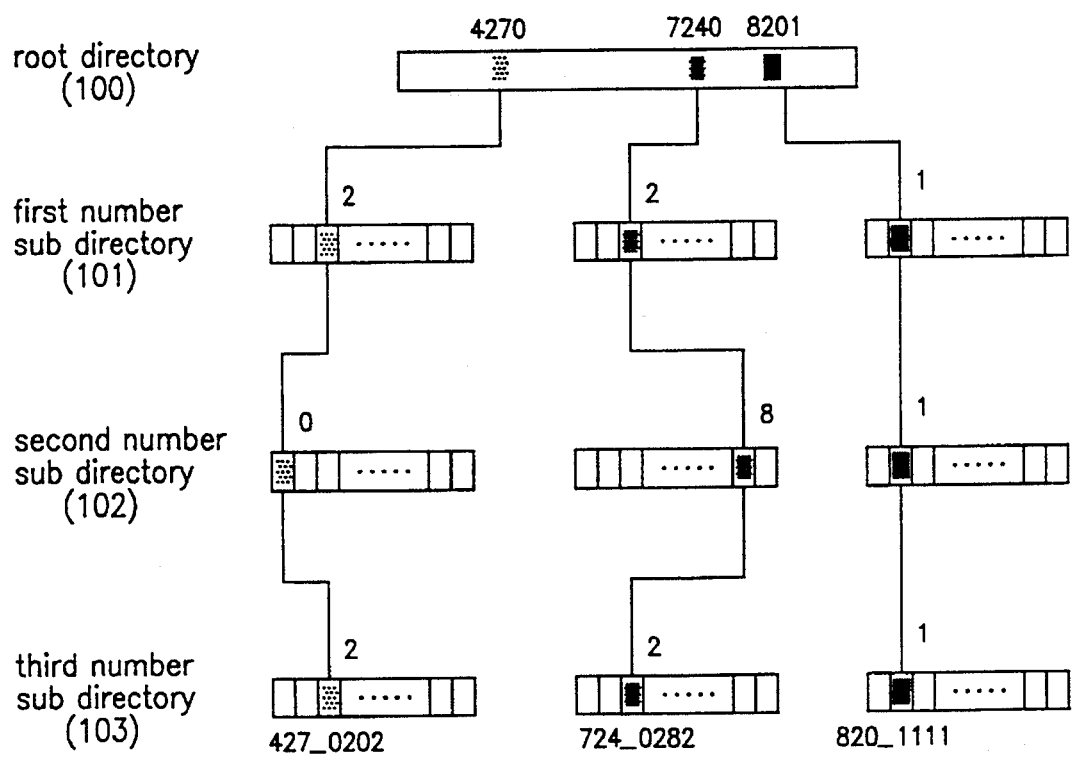
FIG. 2 is a diagram illustrating a physical data access structure for subscriber location information.
Figure 3:
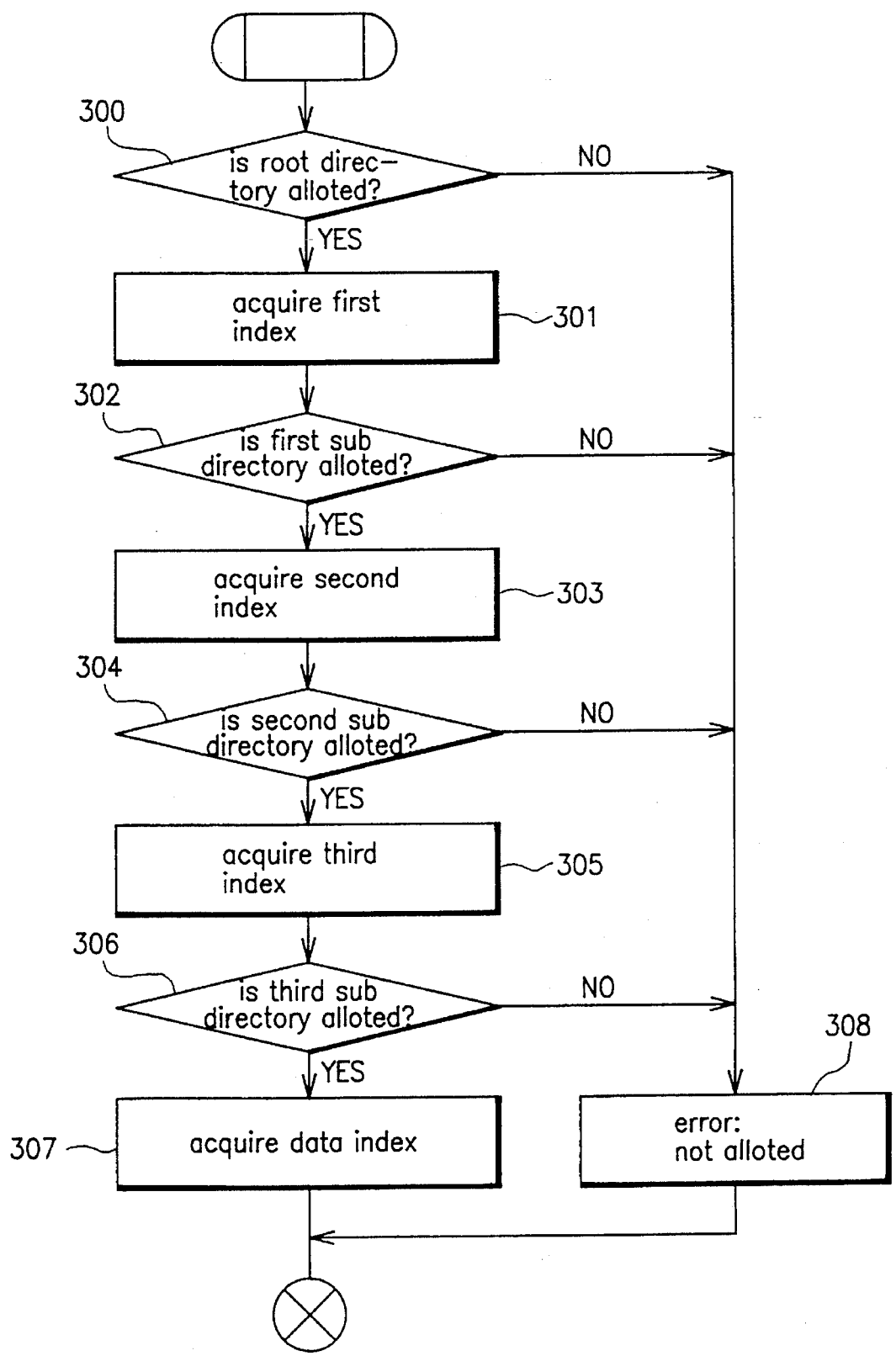
FIG. 3 is a flow chart of a data search procedure for subscriber location information.

FIG. 2 shows a physical data access control structure for subscriber location information.

The structure has a sort of a multi-dictionary hash and translates a subscriber identification number of a decimal digit, thereby acquiring an index for designating data record in which the subscriber location information is stored.

In controlling said subscriber location information, it searches or renews the specific data record from the database of the main memory using a subscriber identification number as a search key.

To be concrete, the search key of the subscriber location information is consist of lower 7 bits of the subscriber identification number and is divided into four section consisting of a root directory index of 4 bits, a first number of 1 bit, a second number of 1 bit and a third number of 1 bit.

The search for the subscriber location information is carried out as follows.

First, a first index acquisition step 101 for acquiring a first sub directory index from the root directory using the root directory index, is carried out and then a second index acquisition step 102 for acquiring a second sub directory index from the first sub directory to using the first number, is carried out.

And, a third index acquisition step 103 for acquiring a data index indicating the location which the subscriber location information is stored at, from a third sub directory using the second number, is carried out.

The search for the subscriber location information is completed using said acquired data index.

Herein, said each sub directories can store 10 data items and the sub directory index or the data index is recorded in each data item.

FIG. 9 shows a flow chart of a search procedure for the subscriber location information.

Before a search for subscriber location information, the subscriber identification number of V bits is divided into the root directory index of 4 bits, the first number of 1 bit, the second number of 1 bit and the third number of 1 bit. Said division is regarded as a search key division.

A first index determination step 300 for determining whether a first index is allotted in the root directory using the root directory index, is carried out. As a result of carrying out the first index determination step 300, the procedure is completed in case where the first index is not allotted, and the first index acquisition step 301 for acquiring the first sub directory index in case where the first index is allotted.

A second index determination step 302 for determining whether a second index is allotted in the first sub directory using the first index, is carried out. As a result of carrying out the second index determination step 302, the procedure is completed in case where the second index is not allotted, and the second index acquisition step 303 for acquiring the second sub directory index in case where the second index is allotted.

A third index determination step 304 for determining whether a third index is allotted in the second sub directory using the second index, is carried out. As a result of carrying out the third index determination step 304, the procedure is completed in case where the third index is not allotted, and the third index acquisition step 305 for acquiring the third sub directory index in case where the third index is allotted.

A fourth index determination step 306 for determining whether a data index is allotted in the third sub directory using the third index, is carried out. As a result of carrying out the fourth index determination 306, the procedure is completed in case where the data index is not allotted, and the fourth index acquisition and search step 307 for acquiring the data index and for searching the subscriber location information in case where the data index is allotted.

As a result of carrying out said first to fourth index determination steps 300, 302, 034 and 306, a displaying step 308 for displaying an error in case where each indexes is allotted in each sub directories.

Figure 4:
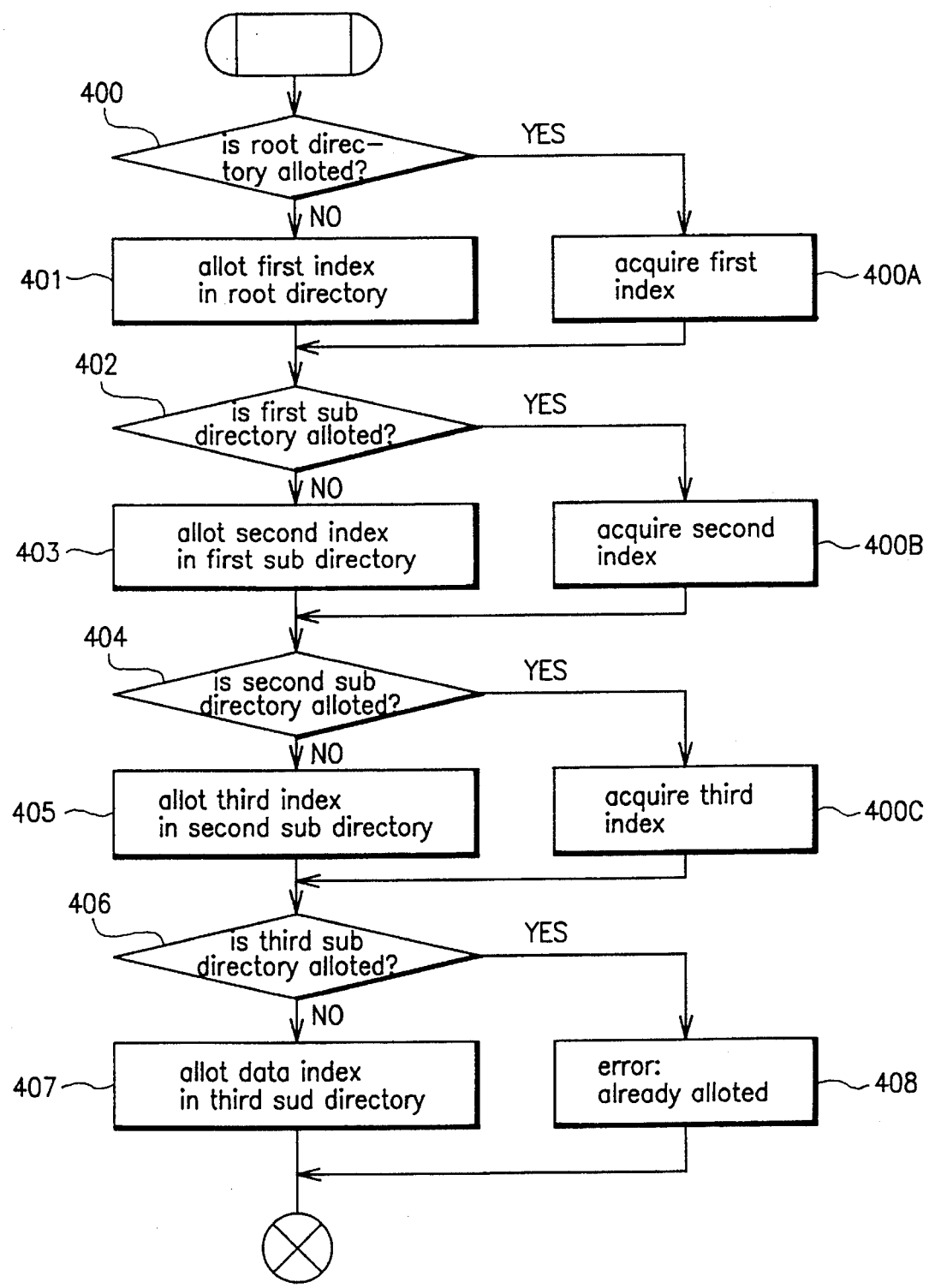
FIG. 4 is a flow chart of a data addition procedure for subscriber location information.

FIG. 4 shows a flow chart of an addition procedure for the subscriber location information.

Before an addition for the subscriber location information, the subscriber identification number of 7 bits is divided into the root directory of 4 bits, the first number of 1 bit, the second number of 1 bit and the third number of 1 bit. Said division is regarded as a search key division.

A first index determination step 400 for determining whether a first index is allotted in the root directory using the root directory index, is carried out. As a result of carrying out the first index determination step 400, a first allot step 401 for allotting an index number of new sub directory as the first index in case where the first index is not allotted, and the first index acquisition step 400A for acquiring the first sub directory index in case where the first index is allotted.

A second index determination step 402 for determining whether a second index is allotted in the first sub directory using the first index, is carried out. As a result of carrying out the second index determination 402, a second allot step 403 for allotting an index number of new sub directory as the second index in case where the second index is not allotted, and the second index acquisition step 400B for acquiring the second sub directory index in case where the second index is allotted.

A third index determination step 404 for determining whether a third index is allotted in the second sub directory using the second index, is carried out. As a result of carrying out the third index determination step 404, a third allot step 405 for allotting an index number of new sub directory as the third index in case where the third index is not allotted, and the third index acquisition step 400C for acquiring the third sub directory index in case where the third index is allotted.

A fourth index determination step 406 for determining whether a data index is allotted in the third sub directory using the third index, is carried out. As a result of carrying out the fourth index determination 406, an addition step 407 for adding subscriber location information by allotting a location number for storing new data as the data index in case where the data index is not allotted, and a procedure completion step 408 for completing the procedure is carried out in case where the data index is allotted, thus an error is generated.

Figure 5:
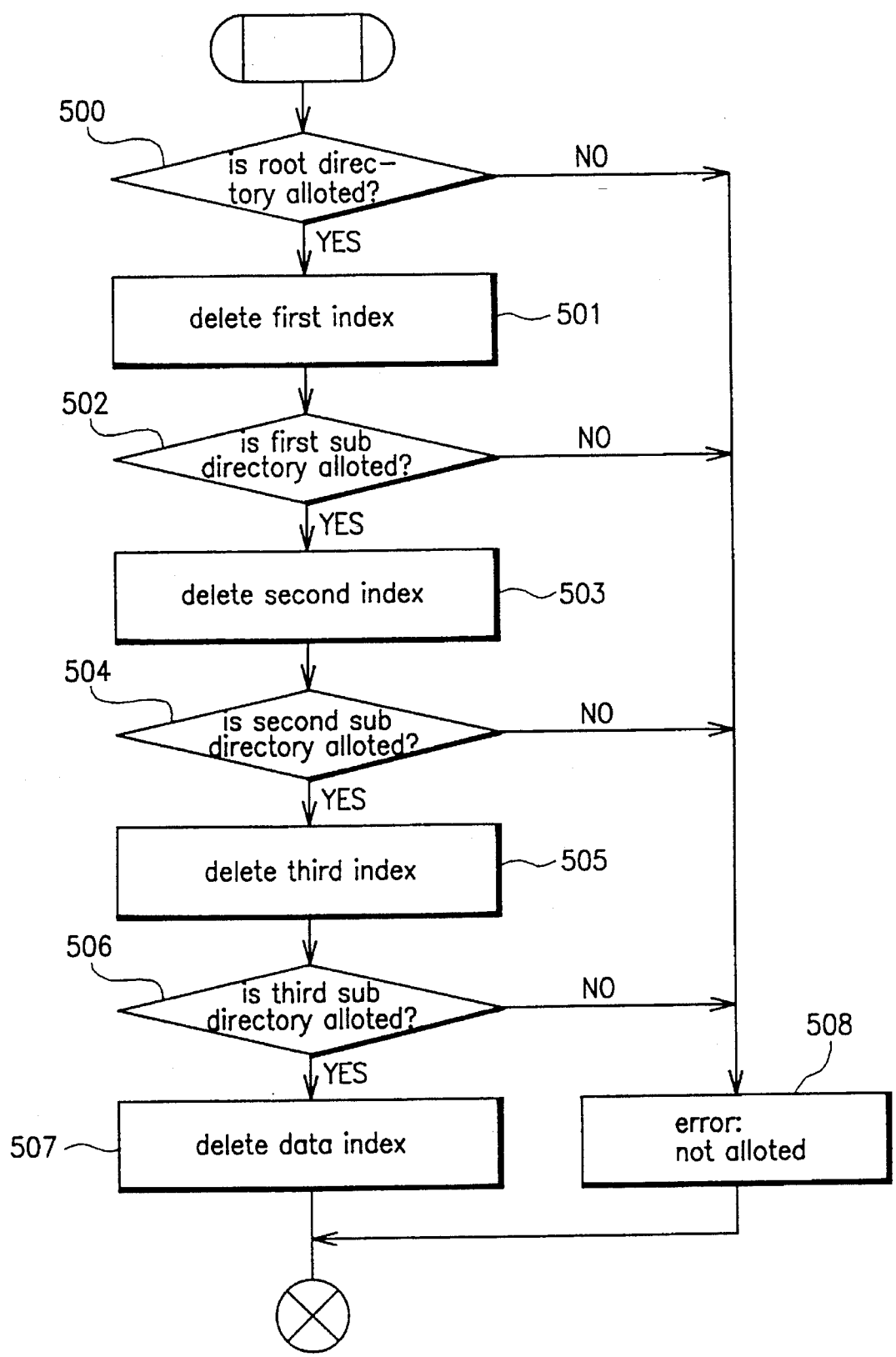
FIG. 5 is a flow chart of a data deletion procedure for subscriber location information.

FIG. 5 shows a flow chart of a deletion procedure for the subscriber location information.

Before a deletion for subscriber location information, the subscriber identification number of 7 bits is divided into the root directory index of 4 bits, the first number of 1 bit, the second number of 1 bit and the third number of 1 bit. Said division is regarded as a search key division.

A first index determination step 900 for determining whether a first index is allotted in the root directory using the root directory index, is carried out. As a result of carrying out the first index determination step 900, the procedure is completed in case where the first index is not allotted, and the first index deletion step 901 for deleting the first sub directory index in case where the first index is allotted.

A second index determination step 902 for determining whether a second index is allotted in the first sub directory using the first index, is carried out. As a result of carrying out the second index determination 502, the procedure is completed in case where the second index is not allotted, and the second index deletion step 509 for deleting the second sub directory index in case where the second index is allotted.

A third index determination step 504 for determining whether a third index is allotted in the second sub directory using the second index, is carried out. As a result of carrying out the third index determination step 504, the procedure is completed in case where the third index is not allotted, and the third index deletion step 505 for deleting the third sub directory index in case where the third index is allotted.

A fourth index determination step 506 for determining whether a data index is allotted in the third sub directory using the third index, is carried out. As a result of carrying out the fourth index determination step 506, the procedure is completed in case where the data index is not allotted, and the fourth index deletion step 507 for deleting the data index and the subscriber location information in case where the data index is allotted.

As a result of carrying out said first to fourth number allot steps 500, 502, 504 and 506, a display step 508 for displaying an error in case where each indexes is allotted in each number sub directories.

According to the present system configuration, the main memory of 32M bytes stores and controls a database of about 20M bytes and constructs an effective data access structure, thereby embodying a real time system based on the main memory database.

The system of above structure can be applicable to solve the problem on real time process in the prior communication system or automation system and can satisfy a fast response characteristic and high data process amounts demanding for the subscriber location information control.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A data access method for subscriber location information in a digital mobile communication network comprising:

a data search step for searching the subscriber location information including:

a first determination step for determining whether a first index is allotted in a root directory using a root directory index;

a first acquisition step for acquiring a first sub directory in case where the first index is allotted as a result of carrying out the first determination step;

a second determination step for determining whether a second index is allotted in the first sub directory using the first index;

a second acquisition step for acquiring a second sub directory index in case where the second index is allotted as a result of carrying out the second determination step;

a third determination, step for determining whether a third index is allotted in a second sub directory using a second index;

a third acquisition step for acquiring a third sub directory index in case where the third index is allotted as a result of carrying out of the third determination step;

a fourth determination step for determining whether a data index is allotted in the third sub directory using the third index;

a fourth acquisition step for acquiring a data index in case where the data index is allotted as a result of carrying out the fourth determination step; and a procedure completion step for completing the procedure in case where each indexes is allotted each directories as a result of carrying out said first to fourth determination steps;

a data addition step for adding the subscriber location information including:

a first determination step for determining whether a first index is allotted in a root directory using a root directory index;

a first acquisition step for acquiring a first sub directory index in case where the first index is allotted as a result of carrying out the first determination step;

a first allot step for allotting an index number of new sub directory as the first index in case where the first index is not allotted as a result of carrying out the first determination step;

a second determination step for determining whether a second index is allotted in the first sub directory using the first index;

a second acquisition step for acquiring a second sub directory index in case where the second index is allotted as a result of carrying out the second determination step;

a second allot step for allotting an index number of new sub directory as the second index in case where the second index is not allotted as a result of carrying out the second determination step;

a third determination step for determining whether a third index is allotted in a second sub directory using a second index;

a third acquisition step for acquiring a third sub directory index in case where the third index is allotted as a result of carrying out the third determination step;

a third allot step for allotting an index number of new sub directory as the third index in case where the third index is not allotted as a result of carrying out the third determination step;

a fourth determination step for determining whether a data index is allotted in the third sub directory using the third index;

a fourth allot step for allotting a location number for storing new data as the data index in case where the data index is not allotted as a result of carrying out the fourth determination step; and a procedure completion step for completing the procedure in case where each indexes is allotted each directories as a result of carrying out of the fourth determination step; and a data deletion step for deleting the subscriber location information including:

a first determination step for determining whether a first index is allotted in a root directory using a root directory index;

a first deletion step for deleting a first sub directory index in case where the first index is allotted as a result of carrying out the first determination step;

a second determination step for determining whether a second index is allotted in the first sub directory using the first index;

a second deletion step for deleting a second sub directory index in case where the second index is allotted as a result of carrying out the second determination step;

a third determination step for determining whether a third index is allotted in a second sub directory using a second index;

a third deletion step for deleting a third sub directory index in case where the third index is allotted as a result of carrying out the third determination step;

a fourth determination step for determining whether a data index is allotted in the third sub directory using the third index;

a fourth deletion step for deleting the data index in case where the data index is allotted as a result of carrying out the fourth determination step; and a procedure completion step for completing the procedure in case where each indexes is not allotted as a result of carrying out the fourth determination step.

* * * * *